United States Patent

[11] 3,622,463

| [72] | Inventors | Hiroshi Iizuka<br>Tokyo;<br>Yaichi Ayukawa, Tokyo; Mikio Suekane, Saitama; Mutsuo Kanno, Tokyo, all of Japan |
|---|---|---|
| [21] | Appl. No. | 850,333 |
| [22] | Filed | Aug. 11, 1969 |
| [45] | Patented | Nov. 23, 1971 |
| [73] | Assignee | CPC International Inc.<br>Continuation of application Ser. No. 666,979, Sept. 11, 1967, now abandoned. This application Aug. 11, 1969, Ser. No. 850,333 |

[54] PRODUCTION OF EXTRACELLULAR GLUCOSE ISOMERASE BY STREPTOMYCES
10 Claims, No Drawings

[52] U.S. Cl. .................................................. 195/66 R, 195/31 R
[51] Int. Cl. .................................................. C12d 13/10
[50] Field of Search .................................................. 195/31, 66; 99/142

[56] References Cited
FOREIGN PATENTS

| 1,103,394 | 2/1968 | Great Britain................. | 195/31 |
| 41-7431 | 4/1966 | Japan............................ | 195/66 |

OTHER REFERENCES

Tsumura et al., Agr. Biol. Chem., Vol. 29, No. 12, p. 1129–1134, (1965).

Takasaki, Agr. Biol. Chem., Vol. 30, No. 12, p. 1247–1253 (1966).

*Primary Examiner*—Lionel M. Shapiro
*Attorneys*—Frank E. Robbins, James L. Bailey, Janet E. Price, Robert D. Weist and Martha A. Michaels

ABSTRACT: Covers a glucose isomerase enzyme preparation having extracellular enzyme activity. Also covers a method of producing the above enzyme preparation, particularly by employing a mixture of starch and xylose as a suitable carbon source in a culture medium and by utilizing a Streptomyces species as the organism capable of producing this enzyme preparation. In addition, covers a method of isomerizing glucose to fructose by contacting glucose with the above enzyme preparation.

PRODUCTION OF EXTRACELLULAR GLUCOSE ISOMERASE BY STREPTOMYCES

This is a continuation of application Ser. No. 666,979, filed Sept. 11, 1967 and now abandoned.

The isomerization of glucose by the action of aqueous alkali has long been known. Catalysts such as sodium hydroxide, sodium carbonate, calcium hydroxide, alkaline earth carbonates, alkaline ion exchangers, ammonia, pyridine, etc. have been utilized to isomerize glucose. However, the yields of fructose thereby formed amount to about 20–30 percent as a maximum, making the process extremely unattractive from a commercial standpoint. Again, the isolation of fructose from the reaction mixture, if desired, can be performed only with great difficulty and with considerable losses, making the overall process even less feasible industrially.

In attempts to improve upon the above process, there have been proposed a number of glucose isomerization methods involving the action of enzymes. These proposed methods have been found unacceptable commercially for one or more reasons of poor yield, slow order of reaction, difficulty in obtaining the desired enzyme preparation, inability to recover in an efficient manner the fructose component, if desired, etc. In particular, enzyme processes of this type heretofore have all involved use of substantially intracellular enzyme systems. That is, the culture medium employed only contains the enzyme within the organism cell or tightly adherent thereto. While the cells can be broken down artificially to produce an extracellular enzyme source, such as by disintegrating them with a sonic or supersonic disintegrator, this extra step is time consuming and sometimes difficult to carry out, and leads to materially increased overall production costs in the isomerization method.

In view of the above, it would be extremely advantageous to produce a glucose isomerase enzyme preparation which has a high degree of extracellular enzyme activity. If this type of activity could be achieved directly without resort to the added burdensome step of cell breakage, such discovery would be a material advance in the art. It is greatly preferred that an enzyme preparation possess a high degree of extracellular enzyme activity for a number of other reasons. For example, it is generally felt that intracellular enzymes act more slowly in their particular role, compared to the extracellular class. The extracellular enzyme materials are generally thought to be more active in both achieving a higher degree of isomerization, and as well, realizing this high percent yield in substantially less time, compared to utilization of the intracellular sources. Even more important, there is theoretically a lesser limitation to the amount of extracellular enzyme that an organism can produce. On the other hand, the amount of intracellular enzyme present is, of course, dependent upon the amount of organism cells present as biologically created. To date, however, there has not been found in the art a glucose isomerase enzyme preparation which is entirely extracellular in character, or even a preparation which has a high degree of extracellular enzyme activity in addition to the intracellular type.

In view of the above, it therefore becomes an object of the invention to provide a glucose isomerase enzyme preparation characterized as having a high degree of extracellular enzyme activity.

Yet another object of the invention is to provide a method of producing the just described enzyme system.

A particular object of the invention is to provide the above method of producing the desired glucose isomerase enzyme by growing a suitable micro-organism in a specific culture medium resulting in high enzyme yield, compared to similar methods utilizing other known carbon sources in the culture medium.

Still another object of the invention is to provide a method of isomerizing glucose to fructose by employment of the just described enzyme preparation.

A still further object of the invention is to provide the above isomerization method which can be adapted to working with high concentrations of glucose substrate, and as well, provides excellent yields of fructose in a relatively short period of time.

Still another object of the invention is to provide a glucose isomerization method which as capable of producing fructose in amounts reaching the theoretical limit dictated by equilibrium considerations.

Other objects will appear hereinafter.

In accordance with the invention a new glucose isomerization enzyme preparation has been discovered. Broadly speaking, this enzyme preparation is an extracellularly derived glucose isomerase enzyme preparation. The invention is also directed to a glucose isomerase enzyme preparation derived from a culture fluid having a substantial proportion of extracellular isomerase activity. The invention is particularly involved with a glucose isomerase enzyme preparation derived solely from the extracellular portion of the culture fluid of a glucose isomerase forming organism. Greatly preferred glucose isomerase enzyme preparations of this type are derived from micro-organisms such as the *Streptomyces venezuelae* species.

By the term "extracellularly derived" is meant that in the culture fluid a substantial proportion of glucose isomerase activity accumulates within the liquid surrounding the cells, as distinguished from activity within the cells themselves. The extracellularly derived enzyme activity can be easily separated from cellular activity by filtration or other simple techniques. Intracellularly derived enzyme activity, on the other hand, is that found within the cells. To release and accumulate this activity one must disrupt the cell membranes either by physical or chemical disruptive procedures.

Broadly speaking, the method of producing the above enzyme system comprises the steps of growing in a culture medium containing a suitable carbon source some organism which is capable of producing this enzyme, and then allowing the enzyme to be formed by said organism. The organism may be derived from a plant, animal or cereal source, and be microscopic or macroscopic in character. It is greatly preferred that the proteinaceous enzyme be produced by utilizing a micro-organism of the bacterial or fungal type.

Particularly suitable in the above proposed method are members of the *Streptomyces* genus. Particularly preferred species among this genus are *Streptomyces venezuelae* and *Streptomyces olivochromogenes*. Cultures of one strain of each of these organisms have been deposited in the American Type Culture Collection, Washington, D.C., and added to its permanent collection of micro-organisms. They have been assigned the following designations: *Streptomyces venezuelae:* ATCC No. 21113; *Streptomyces olivochromogenes:* ATCC No. 21114. We have found that by utilizing these strains or others, we can obtain a useful glucose isomerase enzyme which has extracellular enzyme activity, heretofore unavailable with respect to an enzyme class having this type of activity of isomerizing glucose.

The invention is also broadly concerned with a method of preparing fructose by isomerizing glucose. The steps involved in this aspect of the invention include the just described step of producing the extracellular glucose isomerase enzyme, and then subjecting glucose to the action of the enzyme preparation.

The desired enzyme is prepared in the usual manner. An inoculum prepared, for example, on an agar slant, is used to inoculate a flask containing a suitable medium or nutrient. Thus, for example, a culture containing a *Streptomyces* species capable of producing a glucose isomerase extracellular enzyme preparation is utilized to inoculate a substrate containing an appropriate carbon source. Here the organism is allowed to grow and produce the desired enzyme. The incubation period may vary over a wide range of time, depending upon the particular micro-organism involved, and as well the particular culture medium utilized. Generally, the incubation period may last from about 4 to about 48 hours. In the usual case an aliquot or entire mass organism is then utilized to inoculate a larger volume of nutrient. This may be repeated one or more times. The final culture, with or without purification procedures is used to carry out the isomerization of glucose fructose.

Thus, one can use the total medium directly as a source of glucose isomerase, or the medium can be filtered or otherwise manipulated. The filtrate or centrifugate usually contains the extracellular enzyme preparation which then can be utilized directly or further purified by a number of known methods. Likewise, the intracellular fraction, usually left behind as a solid cellular mass, can either be discarded or separately employed in the glucose isomerization step. For reasons of economy, one normally utilizes the total medium without further separation when the isomerization is being performed on a large industrial scale.

In the usual practice of the invention from 20 percent of the total glucose isomerase enzyme activity up to about 60 percent or even higher is attributed to the extracellular enzyme source.

It should be noted here that not all Streptomyces species or strains are active here in producing a glucose isomerase enzyme preparation having at least extracellular enzyme activity. However, the invention is not to be limited to any particular organism or micro-organism use, as long as that organism has the capability of producing an enzyme preparation characterized as containing at least an extracellular enzyme source which has activity in isomerizing glucose to fructose. As noted above, such enzyme preparations have heretofore been unknown in the art.

In another embodiment of the invention we have discovered a particularly suitable carbon source or nutrient which may be used in producing the above described enzyme preparations. This carbon source is a mixture of xylose and starch which may be used as the sole carbon source or in combination with a variety of other carbon sources such as mannitol, gluconic acid, galactose, glycerin, sorbitol, glucose, and other pure or impure sources of carbohydrates. As will be seen hereinafter, this mixture of xylose and starch as a whole is better as a culture medium nutrient than either of the two components on an equal dosage basis. The nutrient mixture particularly creates a more active enzyme preparation than xylose which has been widely used as a carbon source in preparing glucose isomerase enzyme. Again, starch alone as a carbon source is poorly suited here.

The starch nutrient that is used in practicing the invention may be derived from any vegetable source, such as, for example, corn, wheat, potato, tapioca, rice, sago and grain sorghum. The waxy starches may also be used. The term "starch" is used broadly herein, and encompasses unmodified starch and tailings, and as well, starch that has been modified by treatment with acids, alkali, enzymes or oxidizing agents. Soluble or partially soluble modified starches, dextrins, pregelatinized products, and starch derivatives such as certain cationic, anionic and nonionic starch derived materials are also suitable here. Typical starches useful herein are corn and potato.

The xylose portion of the material may be xylose itself or its native forms that exist in cell walls of almost all plants in the form of xylan polymer, containing xylose sugar as a main constituent. Thus, xylose may be used as present in an impure form in straw, chaff, wood, corn cobs, wheat bran, etc. Usually, the above or other materials are alkali treated to extract the hemicellulose from the various waste pulp materials used as media. In order to obtain the monosaccharide xylose, the hemicellulose is usually hydrolyzed. Thus, by the term "xylose" as used herein is meant to include both the pure material or impure sources containing this carbohydrate.

In one preferred practice the carbon mixture is usually composed of 25–75 percent starch and 25–75 percent xylose based only on total mixture weight of carbon source. Expressed in a different manner the carbon source comprising xylose and starch usually comprises 0.2–10 percent by weight of the culture medium and more often 0.5–2 percent by weight of the medium.

In yet another embodiment of the invention, a particularly desired culture medium also contains a corn steep liquor as a protein source. This combination in addition to the just described mixture of xylose and starch carbon source is especially desirable. Usually the corn steep liquor composed of various amino acids comprises 0.1–5.0 percent by weight based on total weight of the culture medium.

In preparing the enzymes of the invention it is understood that the seed medium and subsequent cell growing media may also contain in addition to the above described carbon sources or others a suitable nitrogen source, inorganic salts, such as magnesium sulfate, potassium dihydrogen phosphate, etc. and other materials if desirable. Usually, the culture such as Streptomyces venezuelae is grown at a pH ranging from about 7 to 9 at a temperature of from about 20° to about 40° C.

Again, the actual isomerization step, depending upon source of enzyme preparation, concentration of glucose, temperature, presence or absence of enzyme cofactors etc. may vary in the time required to reach maximum fructose yields. In the usual case, suitable yields are obtained in a time ranging from about 1 to about 36 hours. During this step the temperature may be room temperature or may be elevated, say to about 50°–70° C. Usually the pH of the glucose system undergoing isomerization is maintained at about 7–9 by use of a suitable buffer system such as a phosphate buffer. Other activators such as magnesium or manganese ions may also be present. It may be possible in some cases to minimize side reactions by addition of inhibitors such as sodium arsenate, sodium arsenite, and sodium fluoride. It is noted that enzyme activity is increased to a maximum by use of an enzyme cofactor such as cobalt in form of cobalt chloride salt.

The glucose itself is usually present in concentrated solution form. Excellent results have been noted when the glucose concentration is 0.5–5.0 molar. It is understood that more dilute sources of glucose may also be isomerized as well as even supersaturated solutions.

The following examples illustrate typical facets of the invention. It is understood, of course, that the examples are presented for illustrative purposes only and are not to be construed as limiting. All references to parts and to percentages are by weight, unless expressly indicated to be otherwise.

EXAMPLE I

Here, extracellular glucose isomerase enzyme preparations were prepared from two species, namely, S. venezuelae, ATCC No. 21113, and S. olivochromogenes, ATCC No. 21114, and the enzyme preparations were utilized to isomerize glucose samples.

The culture medium used in this experiment was composed as follows:

| | |
|---|---|
| Xylose | 0.5 g. |
| Solubilized potato starch | 0.5 g. |
| Peptone | 1.0 g. |
| Meat extract | 0.5 g. |
| Yeast extract | 0.25 g. |
| Sodium chloride | 0.5 g. |
| Magnesium sulfate | 0.05 g. |
| Cobalt chloride | 0.005 g. |

The pH of the culture medium was adjusted to about 7.0 prior to incubation.

After sterilizing and cooling to 25° C., 100 ml. samples of the above xylose-starch medium were inoculated with the just-mentioned species. The inoculations were specifically carried out by inoculating the medium with three loopfuls of cells from xylose-starch agar slants.

After 48 hours of incubation at 29° C., on a shaker to aerate the culture, cells were harvested by centrifuging the culture medium at 10,000 r.p.m. for 10 minutes. The cells were washed twice with 0.85 percent saline solution and suspended in 5 ml. of 0.05 molar phosphate buffer solution (pH 7.5 ). The cell suspension was then treated in a water-cooled sonic oscillator for 20 minutes at 10 kc., and then centrifuged again at 12,000 r.p.m. for 30 minutes. The supernatant fluid was used as a crude source of intracellular glucose isomerase enzyme solution.

Crude extracellular glucose isomerase was prepared by salting out 50 ml. of culture centrifugate with ammonium sulfate at 60 percent saturation. After centrifugation, the partially purified extracellular enzyme solution was obtained by dissolving the precipitate in 4 ml. of 0.05 molar phosphate buffer solution (pH 7.5) and dialyzing the solution against the buffer for a day at 5° C.

The isomerization itself was carried out by preparing a 1.6 molar aqueous solution of glucose which also contained 0.05 molar phosphate buffer, 0.2 molar magnesium sulfate, and 0.02 molar cobalt chloride. Two ml. of the above described enzyme solutions were added to 2 ml. of the glucose solution.

After incubation for three hours at 60° C., 0.5 ml. of the reaction mixture was withdrawn into 4.5 of 0.5 N perchloric acid solution. The amount of fructose formed in the aliquot was determined by the cystein-carbazol method, as described in J. Biol. Chem., 192, 583, (1951). In this test intensity of color was developed for 10 minutes at 60° C. after addition of the reagents. The intensity was then read in a spectrophotometer at 560 m$\mu$ and the amount of fructose present calculated from standards. Results are given as follows. Enzyme activities are calculated to show the activity per milliliter of original culture liquor.

EXAMPLE II

Here the effect of the culturing period on the isomerase activity of S. venezuelae ATCC No. 21113 was studied. The culture medium and other conditions were the same as described in example I with the exception that 10 ml. of a preculture broth was added as an inoculum to 100 ml. main cultivation mixture. Then both the cell and culture filtrate were harvested after 16, 20, 24, 48, 72 and 168 hours of incubation respectively, and utilized as glucose isomerase solutions. Results are presented in table II.

As is apparent the intracellular enzyme activity from S. venezuelae showed maximum activity after only 16 hours of culture and maintained this activity at substantially a constant level for about seven days. The extracellular glucose isomerase enzyme activity of S. venezuelae gradually increased and maintained substantially constant after about two days. Thus, it is seen that a greatly preferred enzyme producing species is S. venezuelae for purposes of the instant invention due to excellent activity in producing both substantial quantities of extracellularly and intracellularly derived enzyme activity.

EXAMPLE III

Here, effect of the carbon source upon enzyme production was studied. In one culture medium 1.0 percent xylose was used. In another 0.5 percent xylose, and 0.05 percent potato starch was utilized. As can be seen from table III below, the starch-xylose containing media induced a higher fructose forming activity compared to xylose, and particularly with respect to inducing the intracellular glucose isomerase enzyme activity.

TABLE III

| Microorganism | Carbon source | Intracellular glucose | Extracellular glucose |
|---|---|---|---|
| | | Isomerase enzyme activity, percent fructose formed | |
| S. venezuelae, ATCC No. 21113. | Xylose-starch | 39.3 | 5.0 |
| | Xylose | 24.5 | 3.5 |
| S. olivochromogenes, ATCC No. 21114. | Xylose-starch | 26.6 | |
| | Xylose | 14.9 | |

It is not entirely understood what particular effect starch has upon fructose production when used as a culture medium. It is theorized, however, that the starch somehow induces or activates micro-organism growth and consequently increases resultant enzyme activity.

EXAMPLE IV

In a further series of studies, S. venezuelae enzyme producing activity over various cultural periods was followed. As is shown below the intracellular glucose isomerase activity was again maintained at a substantially constant level even as long as seven days. The extracellular enzyme activity of this species increased throughout the growth period and reached a constant maximum after about 5 days of culture. Since during this course of time, the intracellular enzyme activity was not proportionally decreased, this particularly points out the fact that the extracellular activity was not originated from intracellular enzyme activity liberated through cell autolysis.

In conducting these studies the following growth media were used for the culture of S. venezuelae ATCC No. 21113. The addition of corn steep liquor to the xylose-starch containing media as a source of nitrogen appeared to further enhance the glucose isomerization.

Composition of the two culture media employed is as follows:

| Corn Steep Liquor Medium-g | | NonCorn Steep Liquor Medium-g | |
|---|---|---|---|
| xylose | 0.5 | Xylose | 11 0.5 |
| potato starch | 0.5 | potato starch | 0.5 |
| steep liquor | 1.0 | Peptone | 1.0 |
| Peptone | 0.5 | Meat extract | + 0.5 |
| Meat extract | 0.5 | Yeast extract | 0.25 |
| Yeast extract | 0.25 | Magnesium sulfate | 0.05 |
| Magnesium sulfate | 0.05 | Cobalt chloride | 0.0024 |
| Cobalt chloride | 0.0024 | | |

The pH of the above media was 7.2 in both cases.

TABLE I

| | Intracellular glucose isomerase activity | | | Extracellular glucose isomerase activity | | |
|---|---|---|---|---|---|---|
| Microorganism | Percent fructose formed | Milligram fructose per ml. culture liquor | Percent fructose per ml. culture liquor | Percent fructose formed | Milligram fructose per ml. culture liquor | Percent fructose per ml. culture liquor |
| S. olivochromogenes | 38.9 | 5.6 | 0.97 | 5.6 | 1.3 | 0.22 |
| S. venezuelae | 37.5 | 5.4 | 0.94 | 24.8 | 5.8 | 0.99 |

TABLE II

| | | Intracellular glucose Isomerase enzyme activity | | | Extracellular glucose isomerase enzyme activity | | |
|---|---|---|---|---|---|---|---|
| Microorganism | Culturing period (hours) | Percent fructose formed | Mg. fructose per ml. culture medium | Percent fructose per ml. culture medium | Percent fructose formed | Mg. fructose per ml. culture medium | Percent fructose per ml. culture medium |
| S. venezuelae | 16 | 39.3 | 5.6 | 0.98 | 7.0 | 1.6 | 0.28 |
| | 20 | | | | 11.0 | 2.5 | 0.44 |
| | 24 | 39.9 | 5.7 | 1.0 | 17.3 | 4.0 | 0.69 |
| | 48 | 36.4 | 5.2 | 0.91 | 19.6 | 4.5 | 0.78 |
| | 72 | 38.0 | 5.5 | 0.95 | 19.7 | 4.5 | 0.79 |
| | 168 | 38.0 | 5.5 | 0.95 | 16.0 | 3.7 | 0.64 |

Tables IV and V below show the results of these various studies. Table IV relates to enzyme activity of *S. venezuelae* derived from a culture medium containing corn steep liquor. Table V shows like activity derived from a noncorn steep liquor medium as set out above. Slightly superior results were obtained when corn steep liquor formed part of the nutrient medium.

TABLE IV

| Time | Hours | | | | Days | | | | |
|---|---|---|---|---|---|---|---|---|---|
| | 16 | 20 | 24 | 30 | 2 | 3 | 5 | 7 | 10 |
| pH | 7.1 | 7.5 | 8.0 | 7.9 | 8.4 | 8.4 | 8.8 | 8.9 | 9.0 |
| Intracellular enzyme activity percent fructose formed | 44.4 | 43.8 | 45.9 | 40.8 | 43.8 | 42.8 | 45.2 | 45.2 | 30.2 |
| Extracellular enzyme activity percent fructose formed | 4.4 | 9.6 | 8.9 | 9.5 | 13.9 | 13.6 | 17.8 | 16.8 | 15.1 |

TABLE V

| Time | Hours | | | | Days | | | | |
|---|---|---|---|---|---|---|---|---|---|
| | 16 | 20 | 24 | 30 | 2 | 3 | 5 | 7 | 10 |
| pH | 7.3 | 7.6 | 7.75 | 8.1 | 8.2 | 8.4 | 8.6 | 9.0 | 9.0 |
| Intracellular enzyme activity percent fructose formed | 39.3 | 40.3 | 41.2 | 37.0 | 40.3 | 40.8 | 32.2 | 40.3 | 34.5 |
| Extracellular enzyme activity percent fructose formed | 3.2 | ...... | 4.3 | 5.4 | 5.0 | 11.6 | 14.6 | 13.4 | 8.0 |

EXAMPLE V

Again, various carbon sources were utilized in preparing a glucose isomerase enzyme, in this case an intracellular glucose isomerase enzyme preparation. As can be seen from the data that is presented in Table VI, the xylose-starch nutrient mixture was definitely superior in producing more active glucose isomerase enzyme preparations compared to xylose or starch alone as nutrient media.

TABLE VI

| Microorganism | Carbon source [1] | Percent fructose | Milligrams enzyme per ml. reaction mixture |
|---|---|---|---|
| S. venezuelae, ATCC No. 21113. | Xylose-starch (50-50 weight percent mixture). | 35.5 | 12.5 |
| | Xylose | 9.2 | 6.8 |
| | Starch | 0 | 5.9 |
| | Glucose | 0 | 13.5 |

[1] Total amount of nutrient employed was same in all cases.

EXAMPLE VI

Here a number of variables were studied with respect to extracellular and intracellular glucose isomerase enzyme preparation production through *S. venezuelae* species, ATCC No. 21113.

First, the extracellular and intracellular enzyme activities were studied with respect to the effect of pH. The conversion reaction from the extracellular type reached an optimum at about a pH of 9.0. The intracellular activity was also optimum at about a pH of 9.0.

Also, various experiments were carried out to see what effect temperature had on activities of both extracellular and intracellular enzymes of *S. venezuelae* in promoting conversion. The intracellular activity increased linearly throughout a temperature range of 40° C., up to about 70° C., for reaction times of both 1 and 3 hours. The optimum was found to be about 70° C. In case of a ½-hour reaction time the optimum temperature was 80° C. If the reaction time is over about 1 hour intracellular activity decreased above a temperature of about 70° C. The same effect of temperature on extracellular activity was noted, except that inactivation occurred at a slightly higher temperature.

In another group of studies, 0.5, 1.0, 2.0, 3.0, and 4.0 mole concentrations of glucose were acted upon by both extracellular and intracellular glucose isomerase enzymes of *S. venezuelae*. It was found that even at the extremely high concentration of 4.0 moles glucose per liter, almost a saturated solution condition, both the extracellular and intracellular enzyme reactions proceeded and approached theoretical equilibrium as the reaction period was extended. Thus, it can be seen that the invention was adapted to isomerizing even highly concentrated glucose solutions, lending it even greater attractiveness in terms of a commercially feasible process.

In yet another series of studies the isomerization reaction was run for a relatively long time in order to determine an approximate equilibrium point. With respect to interconversion utilizing intracellular enzyme from *S. venezuelae* the fructose content reached about 48 percent of added sugar starting from glucose. On the other hand, when fructose was the substrate final fructose content was about 50 percent. Thus, it appears that the equilibrium point is in the neighborhood of about 48–50 percent interconversion.

EXAMPLE VII

It was discovered during laboratory investigations that while a number of Streptomyces species do exhibit extracellularly derived glucose isomerase activity a surprising number did not possess glucose isomerase enzyme activity extracellularly derived. Tests were run as generally outlined in example I on a vast number of Streptomyces species. Results with respect to a few of these are listed below.

TABLE VII

| Micro-organism | Extracellular glucose isomerase activity | |
|---|---|---|
| | mg. fructose per ml. culture liquor | % fructose per ml. culture liquor |
| S. aureus | 0 | 0 |
| S. flaveolus | 0 | 0 |
| S. coelicolor | 0 | 0 |
| S. parvus | 1.4 | 0.24 |
| S. roseochromogenus | 0 | 0 |
| S. purpurascens | 0 | 0 |
| S. scabies | 1.3 | 0.23 |
| S. vinaceus | 1.6 | 0.28 |
| S. tanashiensis | 1.9 | 0.33 |

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of The invention is hereby claimed as follows:

1. A method for producing a glucose isomerase enzyme preparation including glucose isomerase of extracellular origin, that comprises:

growing, in a culture medium containing a suitable carbon source, a micro-organism of the Streptomyces genus that is selected from the group consisting of the species *Streptomyces venezuelae* and *Streptomyces olivochromogenes* and that is capable of producing said enzyme preparation, and recovering the enzyme activity therefrom.

2. A method in accordance with claim 1 wherein the micro-organism is *Streptomyces venezuelae* ATCC No. 21113.

3. A method in accordance with claim 1 wherein the micro-organism is *Streptomyces olivochromogenes* ATCC No. 21114.

4. A method of preparing levulose by isomerizing glucose that comprises:

producing a glucose isomerase enzyme preparation that is characterized by enzyme activity of extracellular origin, by growing in a culture medium containing a suitable carbon source of micro-organism of the Streptomyces genus selected from the group of species consisting of *Streptomyces venezuelae* and *Streptomyces olivochromogenes* and that is capable of producing said enzyme preparation, and subjecting a solution of glucose to the action of the enzyme preparation.

5. A method in accordance with claim 4 wherein the micro-organism is *Streptomyces venezuelae* ATCC 21113.

6. A method in accordance with claim 4 wherein the micro-organism is *Streptomyces olivochromogenes* ATCC No. 21114.

7. A method of producing a glucose isomerase enzyme preparation that comprises:

culturing a Streptomyces species selected from the group consisting of *Streptomyces venezuelae* and *Streptomyces olivochromogenes* in a culture medium comprising at least a mixture of starch and xylose as suitable carbon source materials, at a pH in the range from about 7 to about 9, at a temperature in the range from about 20° C. to about 40° C., to produce a glucose isomerase enzyme preparation of which at least a portion of the enzyme activity is of extracellular origin, and allowing the glucose isomerase enzyme preparation to be formed by said micro-organism 8. A method in accordance with claim 7 wherein the micro-organism is *Streptomyces venezuelae* ATCC No. 21113.

9. A method in accordance with claim 7 wherein the micro-organism is *Streptomyces olivochromogenes* ATCC 21114.

10. A process for producing levulose by isomerizing glucose that comprises:

subjecting a glucose solution having a concentration in the range from about 0.5 molar to about 5 molar to the action of an enzyme preparation prepared in accordance with the method of claim 7, for up to 36 hours, at a temperature in the range from about 50° to about 70° C.

* * * * *